(No Model.)
W. F. HENRY, W. P. BOLLES & A. McKEE.
WHIFFLETREE.
No. 481,028. Patented Aug. 16, 1892.
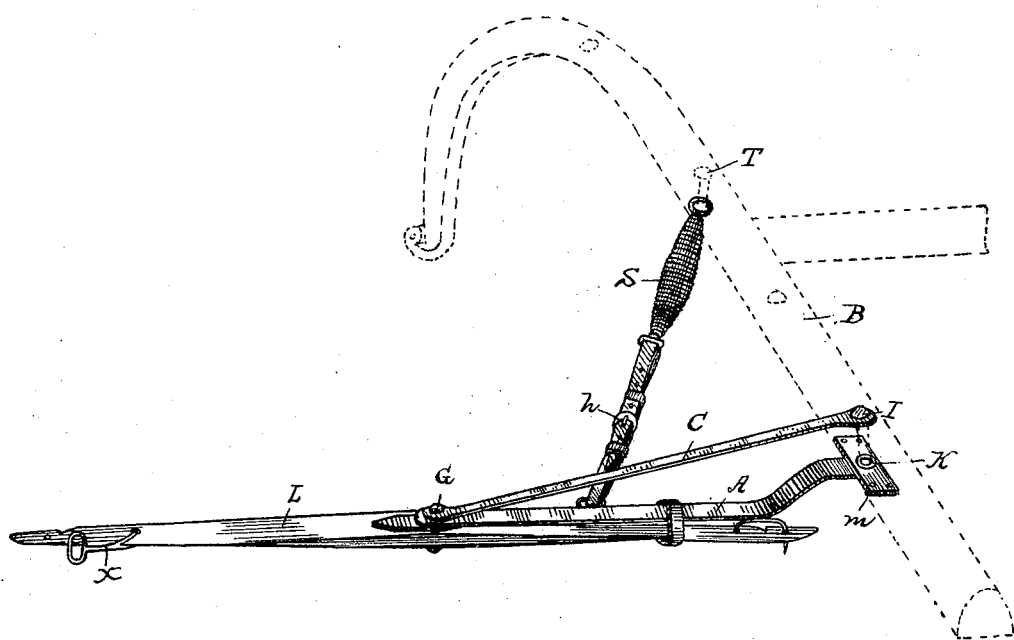
Witnesses
Albert Popkins.
John Tobin Jr.
Inventors
W. F. Henry, W. P. Bolles and
Alfred McKee
by
W H Ruff Attorney

UNITED STATES PATENT OFFICE.

WILLIAM F. HENRY, WILLIAM P. BOLLES, AND ALFRED McKEE, OF BLOOMINGTON, ILLINOIS.

WHIFFLETREE.

SPECIFICATION forming part of Letters Patent No. 481,028, dated August 16, 1892.

Application filed April 1, 1892. Serial No. 427,420. (No model.)

*To all whom it may concern:*

Be it known that we, WILLIAM F. HENRY, WILLIAM P. BOLLES, and ALFRED McKEE, of Bloomington, in the county of McLean and State of Illinois, have invented certain new and useful Improvements in Whiffletree Attachments for Vehicles; and we do hereby declare the following to be a full, clear, and exact description of the invention, such as will enable others skilled in the art to which it appertains to make and use the same.

Our invention is an improved whiffletree attachment for vehicle-shafts; and it consists in certain novel features hereinafter described and claimed.

The object of our invention is to provide an improved device which can be attached to the shafts of vehicles and used either as a flexible or rigid whiffletree attachment for conveniently breaking and training colts and young horses by causing them to travel by the side of an older and well-broken animal. This object we accomplish by the use of the mechanism illustrated in the annexed drawing, in which the figure illustrates a perspective view of my improved device.

Referring to the drawing by letter, B represents the shaft, to the under side of which we secure by screws a plate M, to which is attached by a swivel K the main bar A, as shown. Although we show these screws and prefer to use them, the plate M may be attached to the shaft in any other desired manner.

L designates the whiffletree, which is pivotally attached to a bolt or pivot-pin G, passing through the free end of the bar A and the fixed end of the brace C. The movable end of brace C is brought to a position on top of the shaft B just over the plate M and fastened thereto by a bolt or pivot-pin running downward through the shaft B and plate M, as shown, thus allowing the bar A to play backward and forward as far as the spring S, here attached to under side of shaft B by bolt T and the other end connected by strap N to main bar A, will permit. The attachment X at outer end of whiffletree is used to prevent the young horse from crowding the tug off the end of the whiffletree.

In practice a well-trained animal is harnessed in the shafts, and the horse to be broken is then harnessed to the whiffletree L, after which the team is driven over the road or track in the usual manner. It will be observed that in the use of our improved device the colt is driven outside the shafts, and by using the one-spring attachment there is no possible strain on the colt should he prove fractious, and is only required to travel alongside of a well-broken animal, thereby soon learning to obey the reins and losing any awkwardness or imperfections in his step.

As the training of the colt progresses the rigid form of our improved device can be substituted and the colt gradually taught to bear his share of the draft.

Our device is simple in construction and its advantages seem apparent.

Having thus described our invention, what we claim, and desire to secure by Letters Patent, is—

The combination, with the shaft of a vehicle, of an arm A, pivoted at one end to the shaft and having pivoted to its other end a whiffletree L, a brace C, pivotally connected at one end to the free end of said arm and its other end pivotally connected to the shaft, and an elastic connection between the shaft and the said arm, substantially as and for the purpose described.

In testimony whereof we have signed this specification in the presence of two subscribing witnesses.

WILLIAM F. HENRY.
WILLIAM P. BOLLES.
ALFRED McKEE.

Witnesses:
SAIN WELTY,
J. C. MARTIN.